United States Patent [19]

Kessler et al.

[11] Patent Number: 4,620,064
[45] Date of Patent: Oct. 28, 1986

[54] POCKET SIZED TELEPHONE LINE DATA COMMUNICATION SYSTEMS

[75] Inventors: Bayard F. Kessler, Woodland Hills; Neil F. Nagy, Ranchos Palos Verdes, both of Calif.

[73] Assignee: Novation, Inc., Chatsworth, Calif.

[21] Appl. No.: 648,509

[22] Filed: Sep. 10, 1984

[51] Int. Cl.⁴ .......................................... H04M 11/00
[52] U.S. Cl. .................................................. 179/2 C
[58] Field of Search ................. 179/2 C, 2 DP, 6, 12, 179/103, 178

[56] References Cited

U.S. PATENT DOCUMENTS

| | | | |
|---|---|---|---|
| 3,657,479 | 4/1972 | Sweenie et al. | 179/2 C |
| 4,068,095 | 1/1978 | Ghormley et al. | 179/2 DP |
| 4,162,373 | 7/1979 | Ingber | 179/2 C |
| 4,251,696 | 2/1981 | MacKenzie et al. | 179/103 |
| 4,268,721 | 5/1981 | Nielson et al. | 179/2 C |
| 4,272,655 | 6/1981 | MacKenzie et al. | 179/103 |
| 4,442,318 | 4/1984 | Desrochers | 179/2 C |
| 4,446,333 | 5/1984 | Kessler | 179/2 C |

FOREIGN PATENT DOCUMENTS

57-93758  6/1982  Japan ..................... 179/2 C

Primary Examiner—Keith E. George
Attorney, Agent, or Firm—Blakely, Sokoloff, Taylor & Zafman

[57] ABSTRACT

Pocket sized telephone line data communication devices which include acoustic coupling capabilities are disclosed. The couplers have a primary body member housing a microphone (or speaker) adjacent one face surface thereof for disposition flat against the ear piece (or microphone) of a conventional telephone handset. A flexible slide structure having a speaker (or microphone) therein is coupled to the body member and is slideable with respect thereto to extend outward to cover the microphone (or earpiece) of the handset, the flexibility of the flexible member together with the slide allowing varying amounts of extension and angularity between the flexible member and the body to accommodate handsets of different spans between and angularity of the earpiece and mouthpiece thereof. With the flexible member at its extreme retracted position, the entire assembly is quite small, readily fitting within a man's shirt pocket. Various embodiments are disclosed.

24 Claims, 25 Drawing Figures

POCKET SIZED TELEPHONE LINE DATA COMMUNICATION SYSTEMS

BACKGROUND OF THE INVENTION

1. Field of the Invention.

The present invention relates to the field of acoustic coupled data communication devices.

2. Prior Art.

Data communication devices for communicating over telephone lines are well known in the prior art, such devices generally being referred to as modems or modulator/demodulator sets. Such devices, when transmitting, generally receive a serial digital data stream as an electrical input, convert the digital data stream to some form of signal modulared by the data stream so that the modulated signal is within the expected band pass of the telephone system, and couple the modulated signal to the telephone line for transmission to tne desired receiving device. Reception of course involves the reverse process of receiving the modulated signal coming over the phone line and demodulating the signal to recover the digital data stream. In recent years, modems may be directly coupled to the telephone line, provided such equipment is properly certified, which, together with the modular connectors now being used, frequently makes modem connection to the phone line a very easy task. However, in some cases, particularly in the case of portable equipment, acoustic coupling between the modem and the telephone handset may still be required, as not all phone equipment now has or will have modular connectors, either at the phone line itself or at the handset line.

As integrated circuit technology continues to progress, various electronic equipment such as modems and even many portable terminals can readily be packaged in very small sizes so as to conveniently fit into a shirt pocket, coat pocket or the like. While speakers and microphones may also be made very small, acoustic couplers themselves generally have not been made small because of the underlying physical constraints dictated by the fact that the speaker and microphone in an ordinary telephone handset are separated by approximately six inches (center line to center line) so that most acoustic couplers are on the order of eight inches long, clearly not a convenient shirt pocket size. Further, since there is some variation in the separation and angularity between the mouth piece and earpiece in telephone handsets, acoustic couplers heretofore frequently used relatively large and flexible coupling muffs, and even slideable and/or rotatable muffs to accommodate for such variations. By way of example, in U.S. Pat. No. 3,657,479 an acoustic coupler is disclosed wherein each of the muffs is supported on an axis so as to be rotatable to varying angles as required by a telephone handset, with one of the muffs further being supported so as to be slideable to provide different separations between the muffs. U.S. Pat. No. 4,158,106 discloses a telephone handset acoustic coupling cup wherein each of two such cups are eccentrically rotatably mounted on a case so that the cup openings may be varied in distance from one another by rotating the cups with respect to the case.

In U.S. Pat. No. 4,162,373, a flexible acoustic coupler is disclosed wherein the body member between the two muffs or coupling cups is flexible to allow the appropriate angularity between muffs to mate with a handset, and to further allow the folding of the acoustic coupler in half wben not in use, though even when so folded the coupler is far too large for a shirt or a coat pocket. In U.S. Pat. No. 4,268,721 a portable telephone communication device for the hearing impaired is disclosed, characterized by a pair of body members, each carrying a speaker or microphone, with the two body members being hinged together at the center thereof to allow the required angularity between the body members. The hinge is configured to allow some variation in the separation between the two body members, though the hinge motion is quite limited and the entire device is again relatively large and inappropriate for pocket carrying. Finally, U.S. Pat. No. 4,252,996 discloses individual telephone coupling devices which would be used in pairs to provide both mouthpiece and earpiece coupling. While these couplers are smaller than other couplers, they are separate units except perhaps for electrical connection, as opposed to being a convenient integrated package, are still larger than pocket size and are not really suitable for packaging anything other than or beyond the required coupling speaker and microphone.

BRIEF SUMMARY OF THE INVENTION

Pocket sized telephone line data communication devices which include acoustic coupling capabilities are disclosed. The couplers have a primary body member housing a microphone (or speaker) adjacent one face surface thereof for disposition flat against the ear piece (or microphone) of a conventional telephone handset. A flexible slide structure having a speaker (or microphone) therein is coupled to the body member and is slideable with respect thereto to extend outward to cover the microphone (or earpiece) of the handset, the flexibility of the flexible member together with the slide allowing varying amounts of extension and angularity between the flexible member and the body to accommodate handsets of different spans between and angularity of the earpiece and mouthpiece thereof. With the flexible member at its extreme retracted position, the entire assembly is quite small, readily fitting within a man's shirt pocket. Various embodiments are disclosed, including an embodiment in which the flexible member slides directly into the body member, and another embodiment wherein the flexible member slides into a frame member rotatably attached to and detachable from the body member. Also disclosed are embodiments comprising an acoustic coupler for modems, complete acoustic coupled modems and devices having both acoustic coupled and direct connect capabilities.

BRIEF DESCRIPTION OF THE DRAWINGS

FIGS. 10 and 11 are partial cross sections of the modem of FIG. 8 showing certain details of the internal structure thereof.

FIGS. 12 through 14 are partial cross sections of the connector and the modem for the direct connection of the modem to a telephone line illustrating the structure and operation thereof.

DETAILED DESCRIPTION OF THE INVENTION

Figures 1, 5:
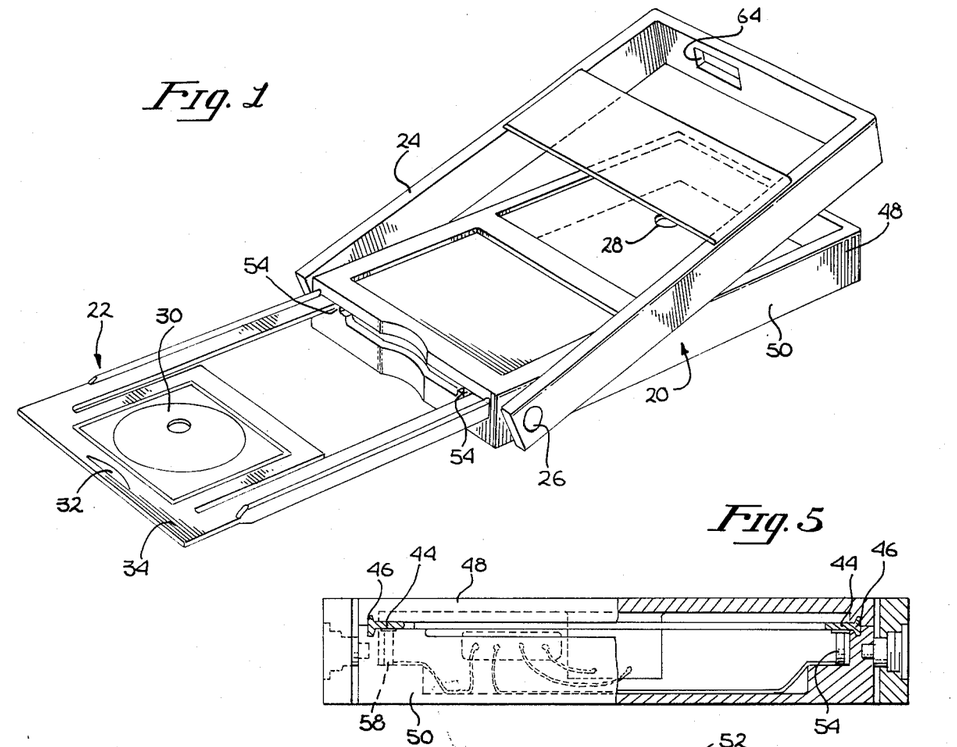
FIG. 1 is a perspective view of one embodiment of the present invention.
FIG. 5 is a top view of a coupler similar to FIG. 2, though with the slide extended.

First referring to FIG. 1, a perspective view of one embodiment of the present invention may be seen. This embodiment as shown serves as an acoustic coupler, though as shall subsequently be seen, may be used to house an entire modem circuit or even a mini portable terminal if desired. The coupler of FIG. 1 is characterized as having three major parts or assemblies, specifically a body assembly generally indicated by the numeral 20, a slide assembly generally indicated by the numeral 22, and a U shaped frame-like member 24 pivotally supported by pivot screws 26 from adjacent one end of the body assembly 20. The body assembly 20 includes one of the coupling elements, specifically a microphone, just below opening 28 in the surface of the body assembly adjacent one end thereof, the slide assembly 22 containing a piezoelectric speaker in region 30 thereof. In FIG. 1 the slide is shown in an extended position so that the separation between the microphone and the speaker is substantially equal to the separation between the earpiece and the mouthpiece of a conventional telephone handset. Of course the separation between the speaker and microphone of the coupler of FIG. 1 may readily be varied to accommodate different sized handsets by sliding the slide in or out somewhat as required. When not in use, the slide will be slid all the way into the body assembly 20 with only the outer edge containing thumb slot 32 (See Also FIG. 2) extending outward to provide a tab for withdrawing the slide again.

Figure 2:
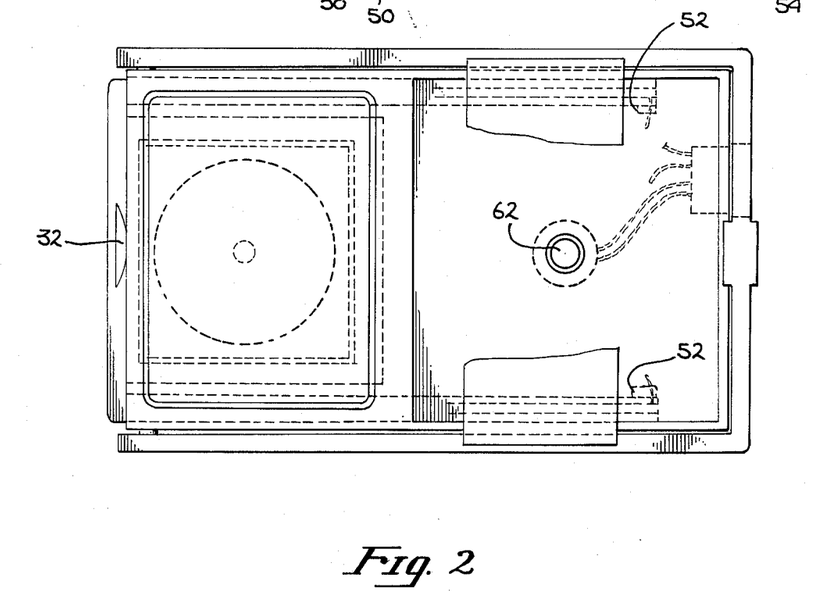
FIG. 2 is a partial cross section of the embodiment of FIG. 1.
Figures 3, 4:
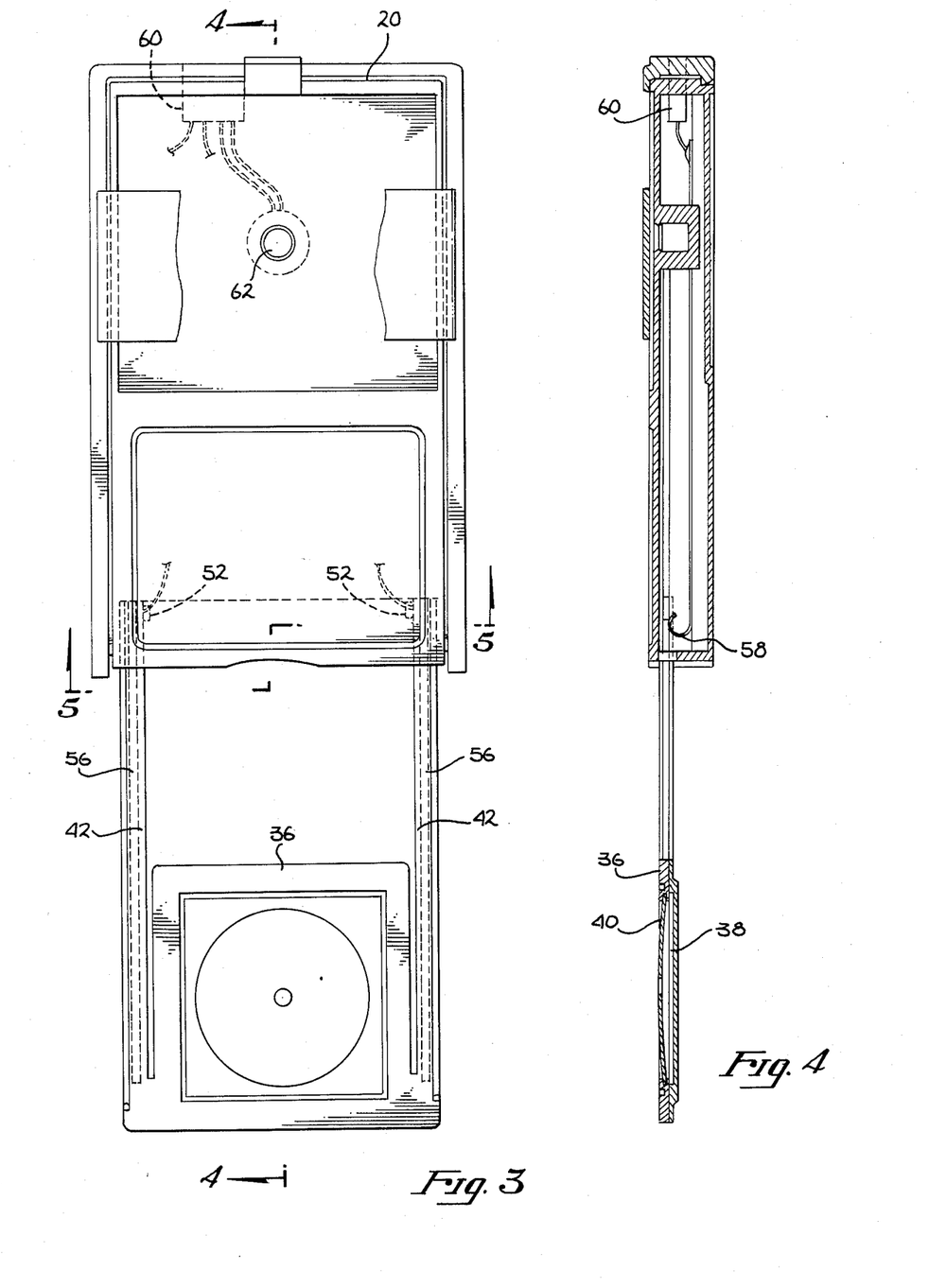
FIG. 3 is a top view of the coupler of FIG. 1 in the slide retracted condition.
FIG. 4 is a side partial cross section of the coupler.

Details of the slide of the preferred embodiment may be seen in the various figures, including FIGS. 2 and 5, though perhaps are best illustrated in FIGS. 1, 3 and 4. In the preferred embodiment, the main structure of the slide is provided by a slide body member 34 of sheet-like form, characterized by an outer rectangular area 36 for holding the piezoelectric speaker 38 and flexible member 40 for abutting the telephone handset, and pair of rail-like members 42 integrally coupled to member 36 at the outer ends of the rail-like members. As may be seen in FIG. 5, the rail-like members are characterized by a substantially flat region 44 which, if desired, may be provided with a T or L shaped edge, a T shaped edge 46 being shown in the figures so as to confine the edge of the rail-like members between cooperatively disposed molded slots in upper body member 48 and lower body member 50. The inner ends of the rail-like members 42 have inward facing tabs 52 (See FIG. 3) which together with upward projecting tabs 54 on the lower body member 50 provide a mechanical stop to prevent the total withdrawal of the rail-like members from the coupler body 20.

The piezoelectric speaker in member 36 of the slide of course requires that two electrical contacts be made between the speaker and the body 20 of the coupler. These connections are preferably made in this embodiment by the combination of conductive strips 56 on the rail-like members 42 in combination with spring wiper members 58 (See FIGS. 4 and 5) which are connected to a connector 60 (FIGS. 3 and 4) at the end of the body 20, either directly or through an intermediate printed circuit board. The conductive strips may be metal strips adhered to the slide, or conductive strips applied through thick film printing techniques, the slide itself preferably being a polycarbonate. The microphone 62 of course is also connected to the connector 60 which in a typical application will be connected by an appropriate cable to the modem itself. In that regard, U shaped member 24 (FIG. 1) has an appropriately disposed opening 64 for allowing the mating connector to pass therethrough when the U shaped member is rotated to a coplanar position with body 20 and slide 22.

Figure 6:
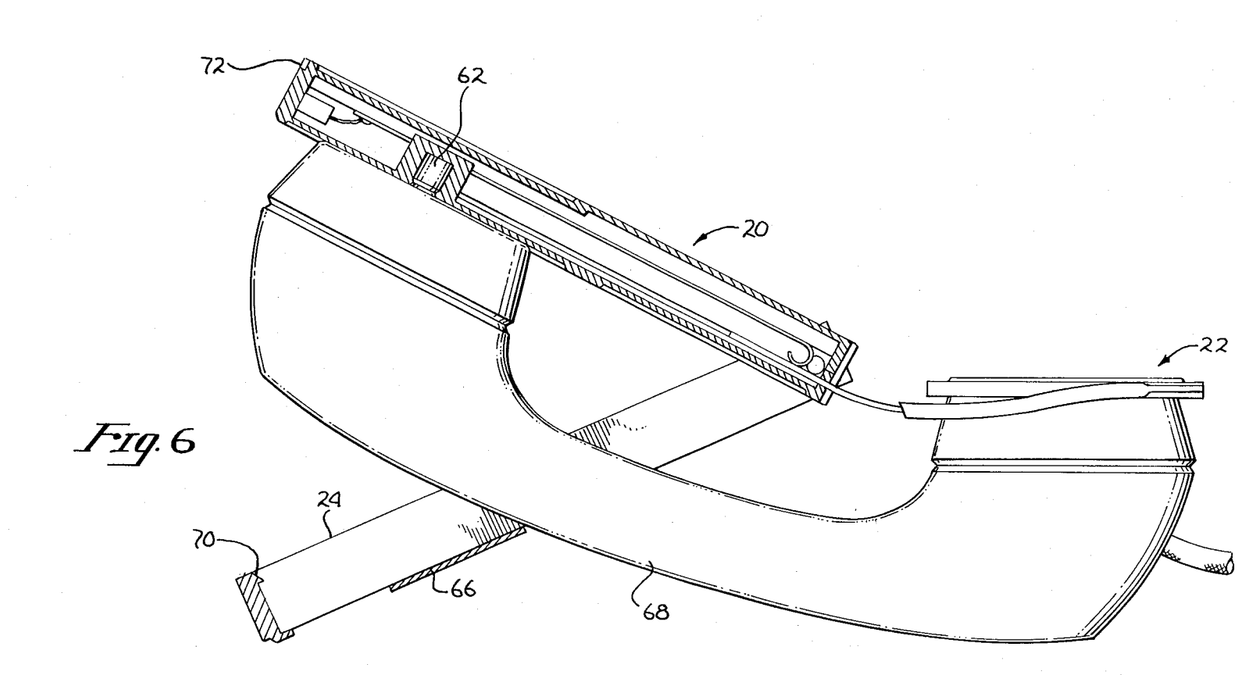
FIGS. 6 and 7 illustrate the mounting of the coupler to a conventional telephone handset.
Figure 7:
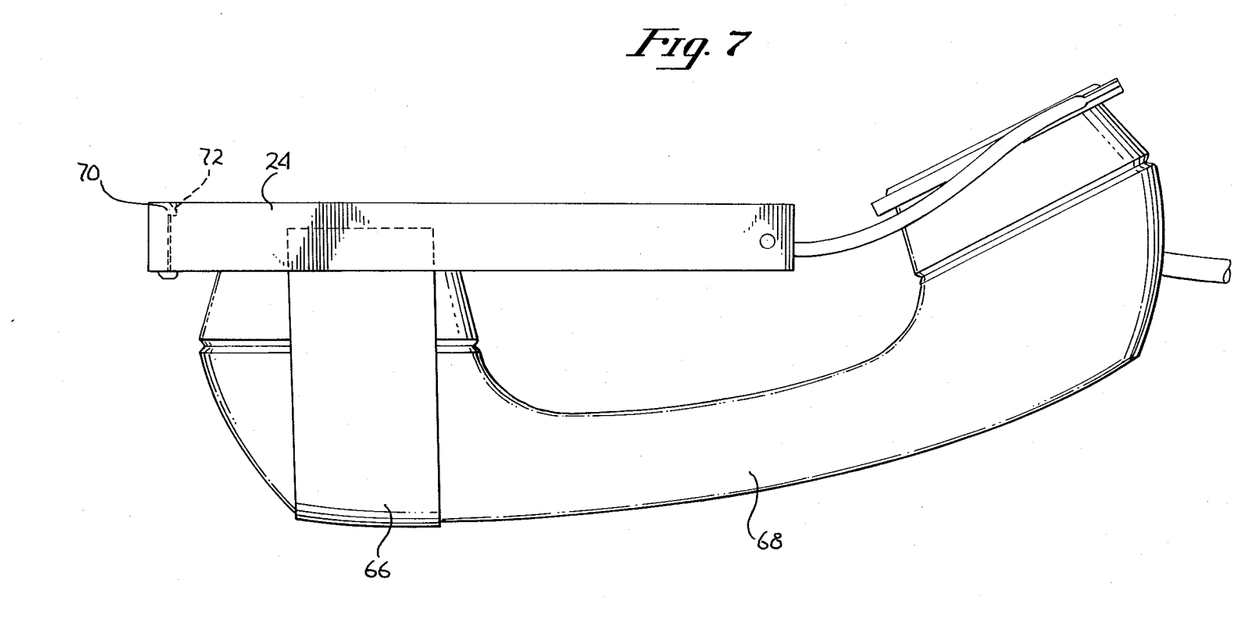

Now referring to FIGS. 6 and 7, the manner of attachment of the coupler of FIG. 1 to a conventional telephone handset may be seen. When attaching the coupler, member 24 is first raised as shown in FIG. 6 and the slide 22 is extended from body 20 by the approximate distance desired. Then the telephone handset 68 is slipped under elastic band 66 to fit flush against the body adjacent microphone 62 which presses the handset mouthpiece flat against member 36 of the slide 22. Thereafter, frame member 24 is forced down over body 20 so that the latch comprised of protrusion 70 and cooperatively disclosed notch 72 in the body 20 engage as shown in FIG. 7, thereby locking the frame member 24 to the body and the entire coupler to the handset. Finally the handset is laid on an appropriate surface, the cable connected to connector 60 and the coupler used in the conventional manner. In this way a coupler on the order of ½ of an inch thick by 3 inches wide by 5 inches long may be achieved so as to be readily carryable in a shirt or coat pocket, and to be adjustable to substantially any reasonable range of phone sizes and characteristics. In that regard, by proper selection of the design characteristics, a coupler mating with Princess type phones as well as ordinary phone handsets may readily be achieved, as the specific manner of support of region 36 and the speaker thereon urges them flat against the microphone portion of the handset. As may be seen in FIG. 6 and 7 this is achieved by the fact that region 36 is supported on rail members 42 from the approximate outer edge thereof, so that the elastic flexing of the rail members fairly well centers the force on member 30 to cause it to lie flat against the mouthpiece of the handset regardless of reasonable variations in the relative position and angularity thereof.

Figure 8:
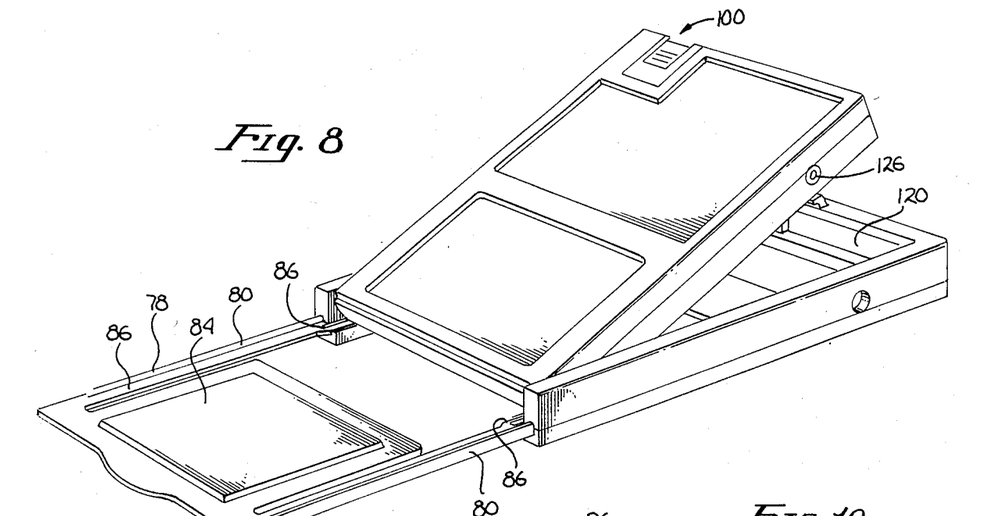
FIG. 8 is a perspective view of an alternate embodiment of the invention comprising a complete direct connect and acoustic coupled modem.
Figure 15:
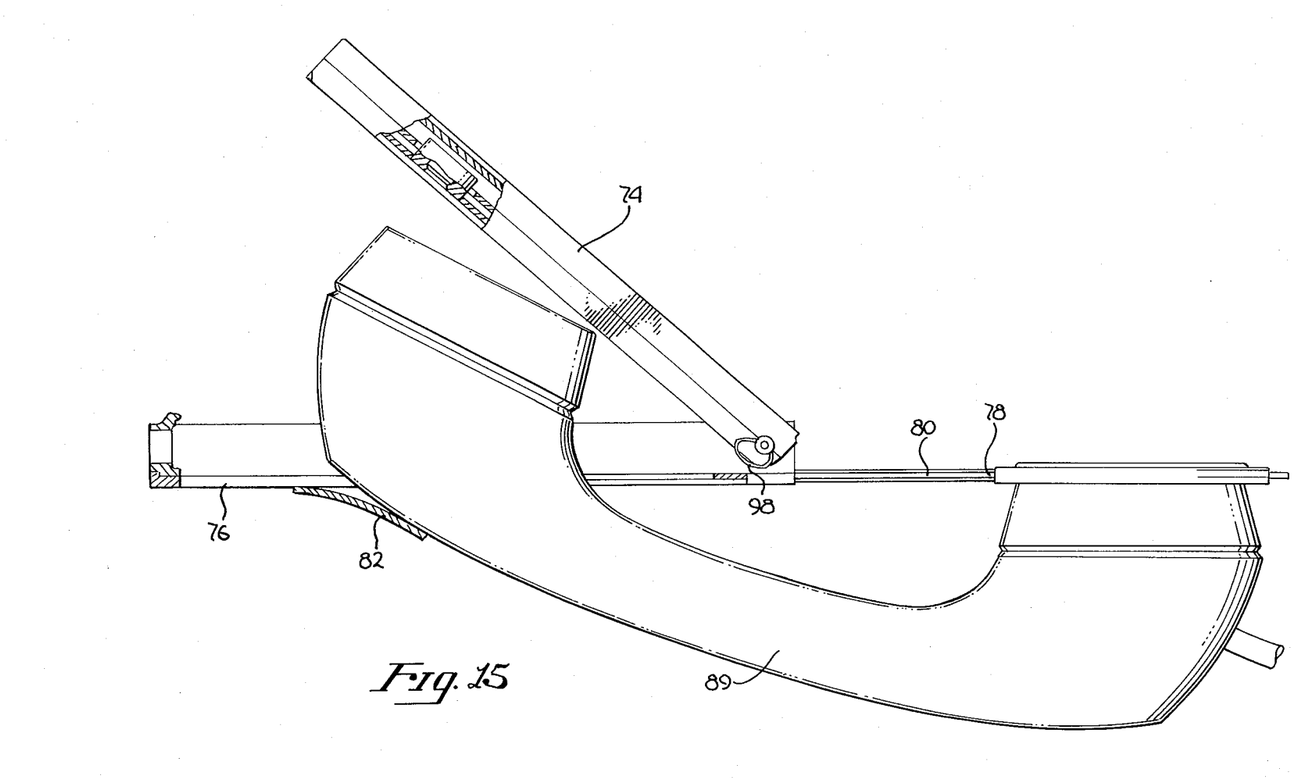
FIGS. 15 and 16 are views illustrating the manner of attachment of the modem of FIG. 8 to a conventional telephone handset and, FIG. 17 is a top view of the modem of FIG. 8 with the slide in the extende position.
Figure 16:
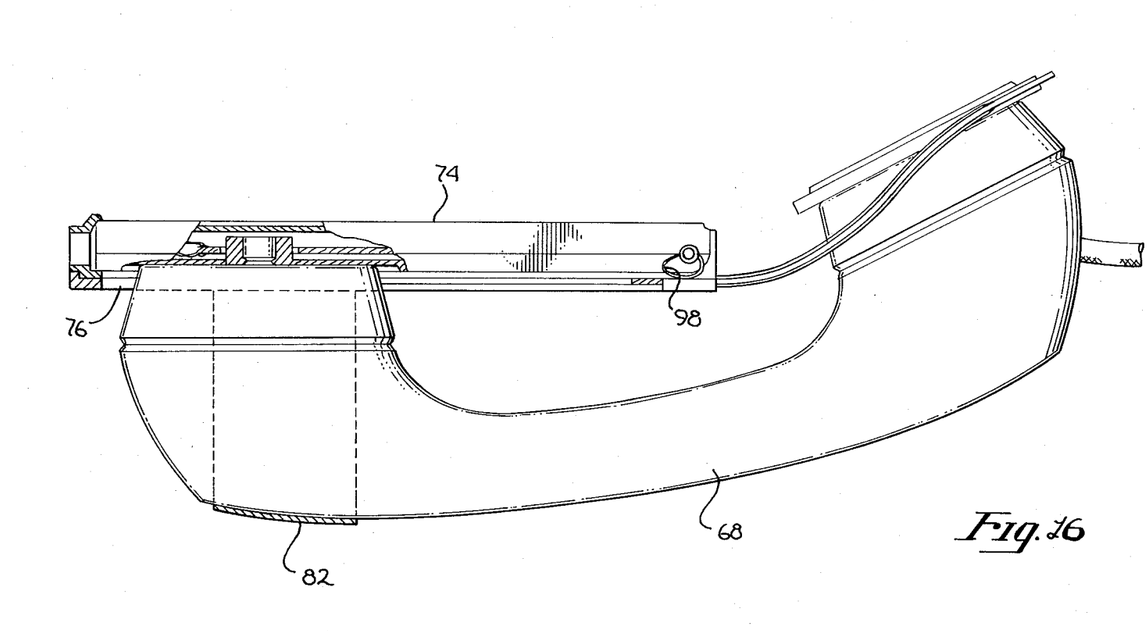

Now referring to FIG. 8, another embodiment of the present invention may be seen. This embodiment is similar in the sense that it also is comprised of three major parts or assemblies, specifically a body assembly 74, a U-shaped frame-like member 76, and a slide assembly 78. However, unlike the embodiment of FIG. 1, the slide assembly 78 slides within the U-shaped frame member 76 rather than in the body member 74, which arrangement has certain advantages over the embodiment of FIG. 1 in certain instances. In particular in the embodiment of FIG. 8 the body member 74 houses a complete modem which may be used as a direct connect and as an acoustic coupled modem as required. As shall subsequently be seen the U-shaped frame-like member 76 together with slide assembly 78, may readily be removed from the body assembly 74 so as to provide a direct connect modem of even smaller size. The sliding of slide assembly 78 in the U-shaped frame-like member 76 rather than in the body member 74 also facilitates the coupling of the modem to a telephone handset as an acoustic coupled modem, as may be seen in FIG. 15. In particular, the angularity between the body member 74 and the slide assembly 78 in the open position shown generally accommodates the angularity between the mouthpiece and earpiece on the telephone handset so that the rail-like members 80 need not be deflected during the mounting of the unit until the body assembly 74 is forced into the frame members 76 as shown in FIG. 16, the elastic strap 82 of course retaining the modem to the handset in the same manner as elastic strap 66 of the first embodiment of the invention.

The technology for providing a modem which may be packaged within the size constraints required for a pocket size direct connect and acoustic modem in accordance with FIG. 8 presently exists and accordingly it is not necessary to present herein detailed circuits or for such modems. By way of example, Novation, Inc., the Assignee of the present invention, produces a number of frequency shift keyed modems based upon a two chip set utilizing large scale integrated circuits which may be set up to be compatible with a number of commercially available modem specifications. At the present time, many personal computers use modems which are compatible with the Bell 103 Series modems, and Novation, Inc. currently produces a very small modem known as the J-CAT modem which is compatible with Bell 103 modems using the two chip chip set. If desired, surface mount technology or hybrid circuits or variations thereof could be used to further reduce the size of the modems if desired, though the circuit referred to before will allow the packaging of the basic modem in the size required without having to resort to particularly advanced circuit board construction techniques. The particular form of the device shown in FIG. 8 however, does require certain special provisions, and make particular use of certain advantages and advancements made by way of the present invention which go beyond conventional modem construction, which aspects and features will be described in detail therein.

Figure 10:
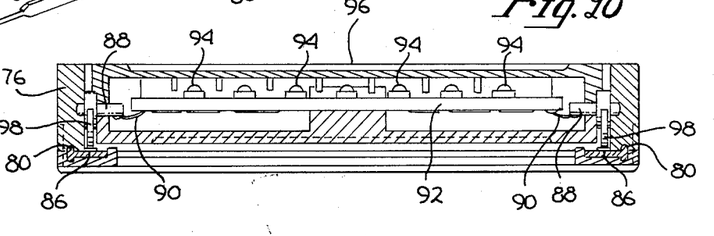

Like the embodiment of FIG. 1, the embodiment of FIG. 8 requires connection to a piezoelectric speaker in region 84, and for this purpose, as before the rails 80 are provided with conductive strips on the surface of region 86 thereof, which strips are connected to the speaker. As may be seen in FIG. 10, the body 74 has a pair of metallic headed pins 88 passing through the sides thereof, which pins are internally connected by conductors 90 to the printed circuit board 92, internal to the body, which printed circuit board carries the modem circuit, and if desired a plurality of mode indicating light emitting diodes 94 visible through appropriate openings in the case and a translucent covering sheet 96.

The headed pins 88 fit within cooperatively disposed sockets in the frame 76 and with the slide assembly 78 in the extended position shown in FIG. 8 allow the slight spreading of the U-shaped frame assembly 76 to remove the body 74, and thus the direct connect modem from the frame assembly for further size reduction if desired or whenever it is known that the modem is to be used in the direct connect mode only. The metallic pins 88 have fastened thereto a loop of spring wire 98 such as a beryllium copper wire which acts as a wiper on the conductive regions 86 of rails 80 to provide electrical contact between the speaker in region 84 of the slide (FIG. 8) and the printed circuit board 92 within the body 74 of the modem.

Figure 9:
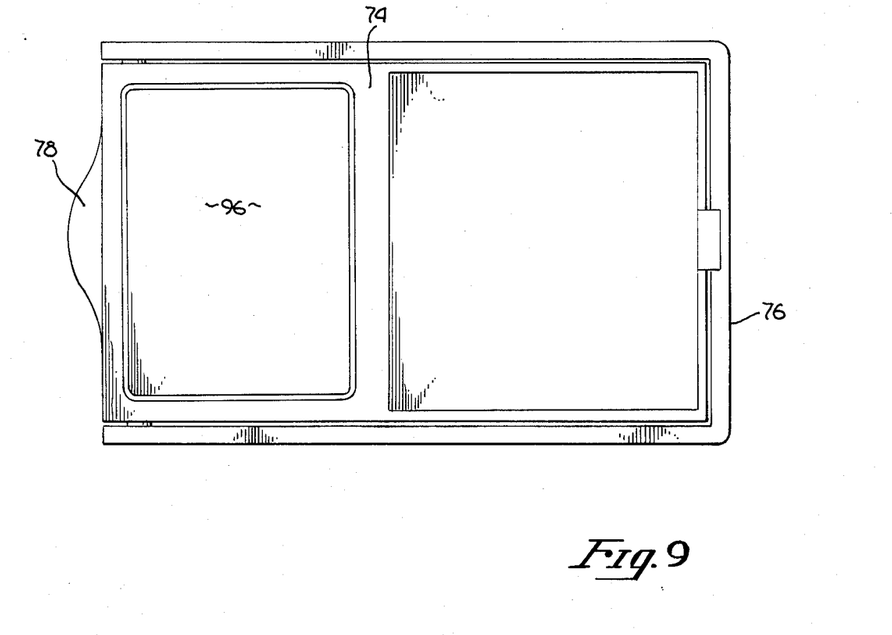
FIG. 9 is a bottom view of the modem of FIG. 8 with a slide in the retracted position.
Figures 11, 12, 13, 14, 17:
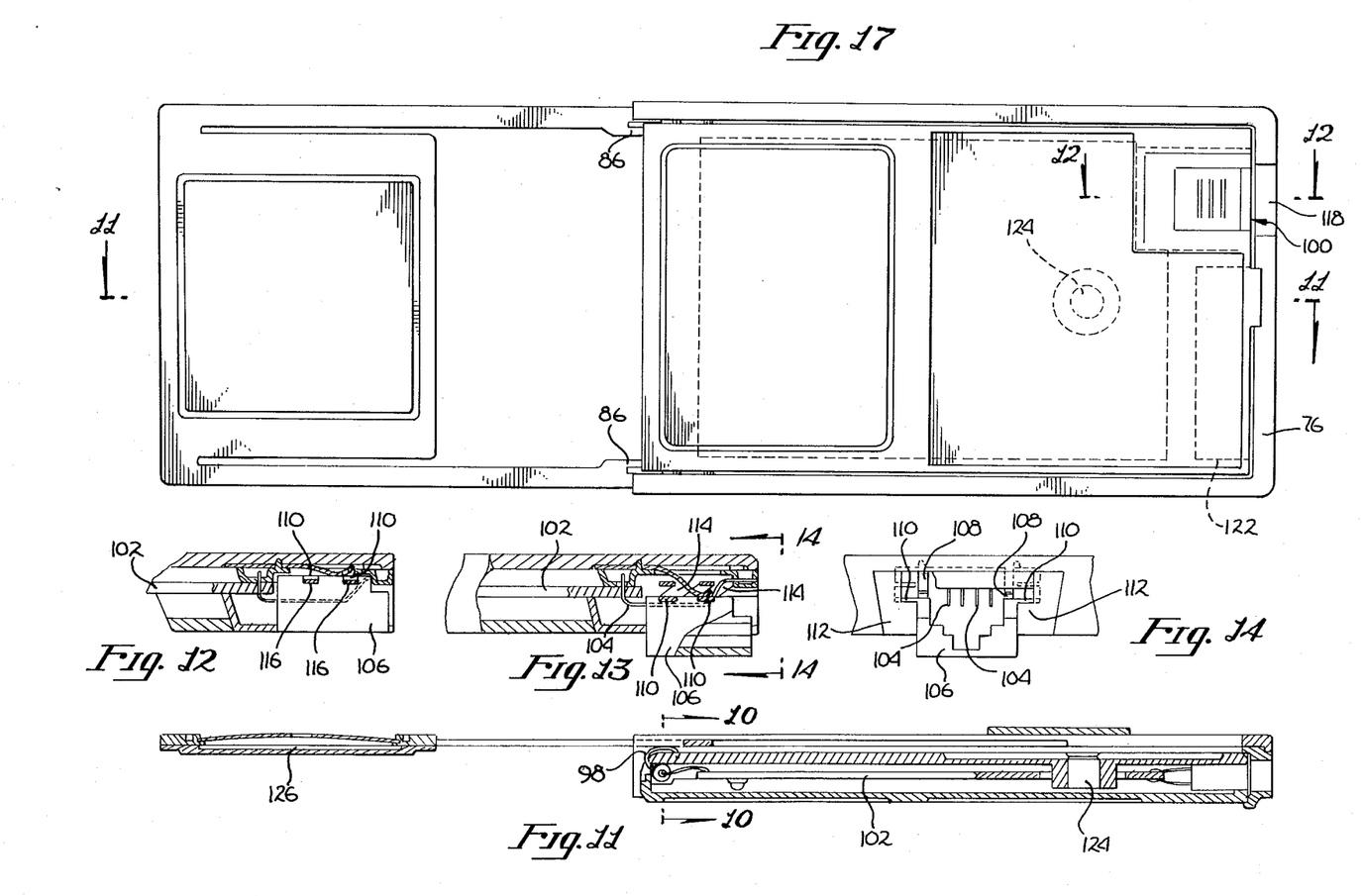

These spring contacts or wipers 98 may also be seen in FIG. 11. With a configuration of the spring contacts as shown, the contacts tend to roll away from the rails when the body member 74 is pivoted away from the frame member 76 to allow easy extension and retraction of the slide assembly without friction and wear on the contacting surfaces as shown in FIG. 15, though when frame member 76 is rotated to be coplanar with and latched to the body 74 of the modem the same spring contacts forceably engage the conductive areas of rails 80 with a wiping motion to provide positive electrical contact thereto, as shown in FIG. 16. Of course with the slide assembly 78 retracted as shown in FIG. 9, electrical contact is not needed and in fact may be purposely avoided by limiting the extent of the conductive regions on rails 80 to essentially automatically disconnect the speaker in region 84 when the modem is used in the direct connect mode, though the friction provided by the spring contacts may still be useful however to retain slide assembly 78 in the retracted position in the direct connect mode and when being carried.

For the direct connect mode, a modular telephone line connection generally indicated by the numeral 100 in FIGS. 8 and 17 is provided. Frame 76 of course includes a relief 118 which provides clearance for the phone line and modular plug when the capture member 106 is in the extended position shown in FIG. 14 and the modem is being used as a direct connect modem.

An additional cutout 120 (see FIG. 8) is also provided to provide access to connector 122 (see FIG. 17) to provide the required coupling between the data device and the modem. As before of course, a microphone 124 is provided adjacent to one end of the modem body and a speaker 126 (see FIG. 11) is provided in the slide assembly.

Figure 18:
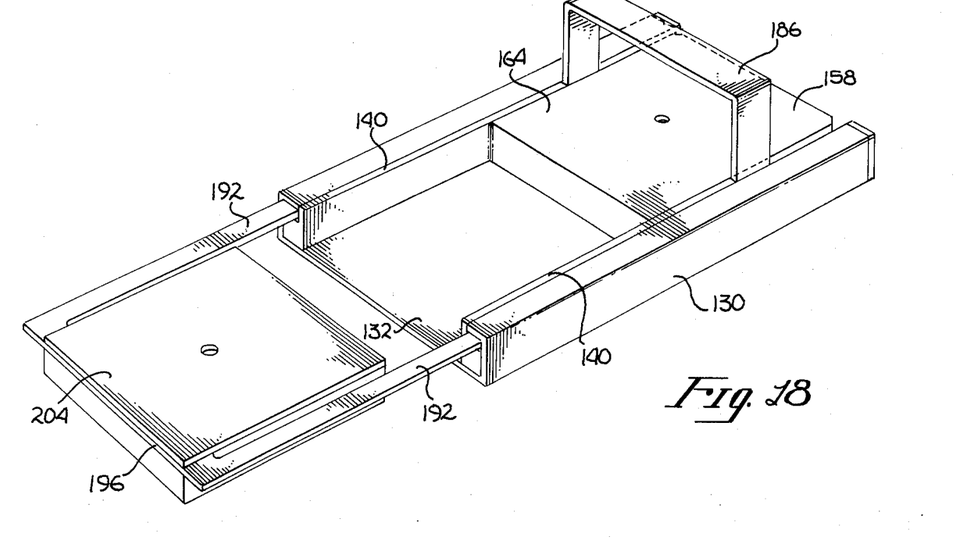
FIG. 18 is a perspective view of a still further alternate embodiment.
Figure 19:
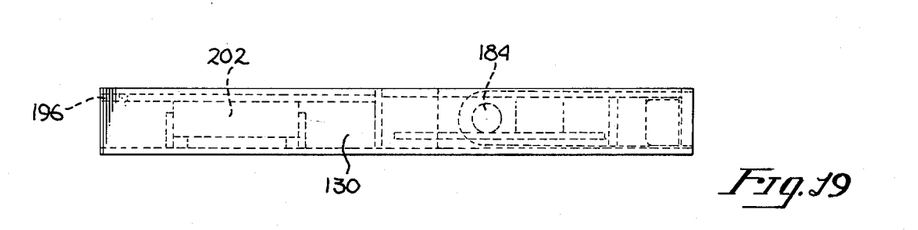
FIGS. 19 through 22 are views illustrating the relative locations of the component parts and the operation of the embodiment of FIG. 18.
Figure 20:
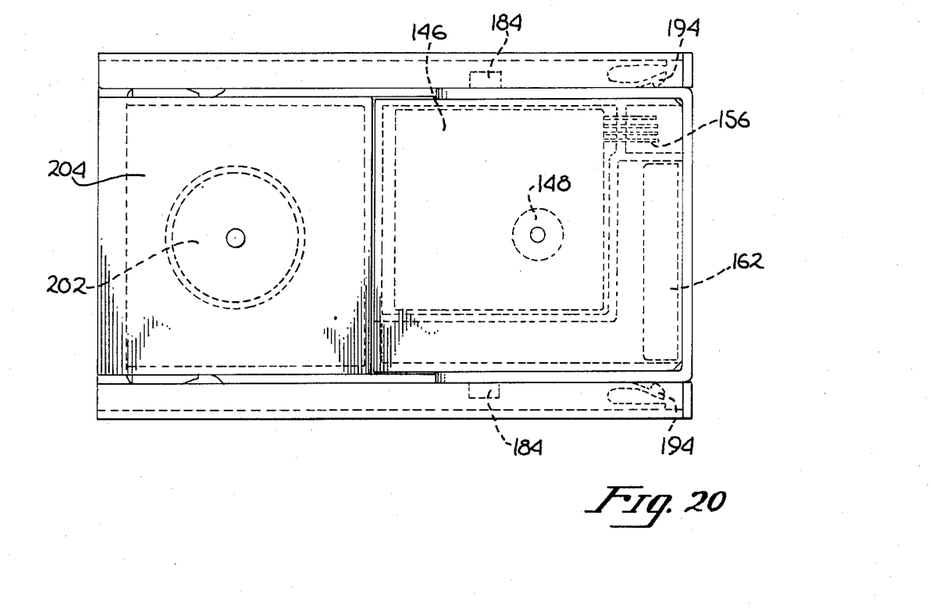
Figure 21:
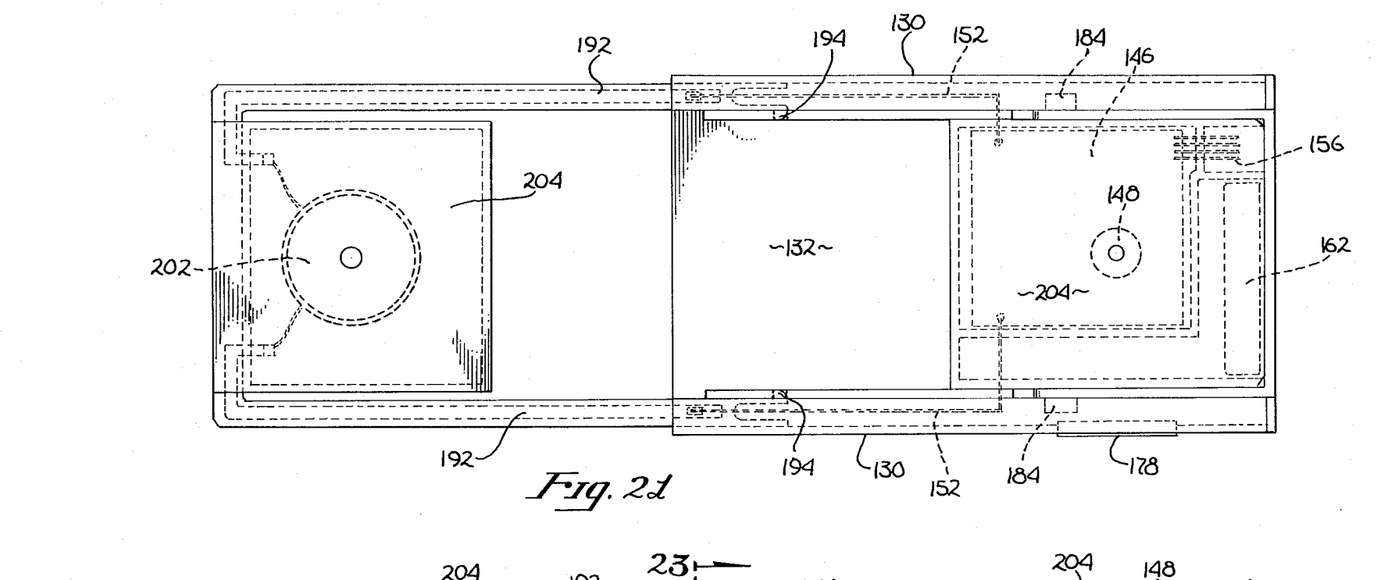
Figures 22, 23:
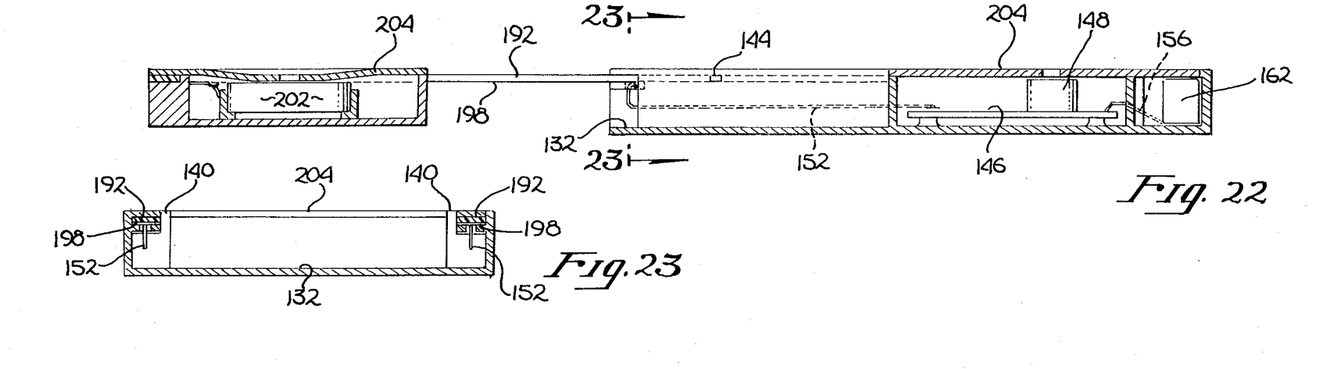
FIG. 23 is a cross-section taken along line 23—23 of FIG. 22.

Now referring to FIG. 18, a still further embodiment of the present invention may be seen with side and top views of this embodiment also being shown in FIGS. 19 and 20. Further, the major parts of the assembly making up this embodiment are shown in a perspective exploded view in FIG. 24, which provides a good reference for the intercooperation of the various elements of the embodiment. In particular, a channel-like plastic frame member 130 constitutes the main frame member for the assembly. The extrusion in effect defines a relatively large slot at the sides thereof by the separation between face 132 and protrusion 134, and a smaller slot between protrusion 134 and the top projection 136. Fitting within the lower slot are insulated members 138 which, among other things, each have upward extending lip 140 which effectively defines an inner face for the upper slot defined by projections 134 and 136. Members 138 each have a small opening 142 (See FIG. 24) adjacent one end thereof, with a cooperatively disposed opening being formed in the projection 134 of member 130. Members 138 also have small openings 144 in the upper protrusions 140 thereof, the function of which openings will be subsequently described.

Figure 24:
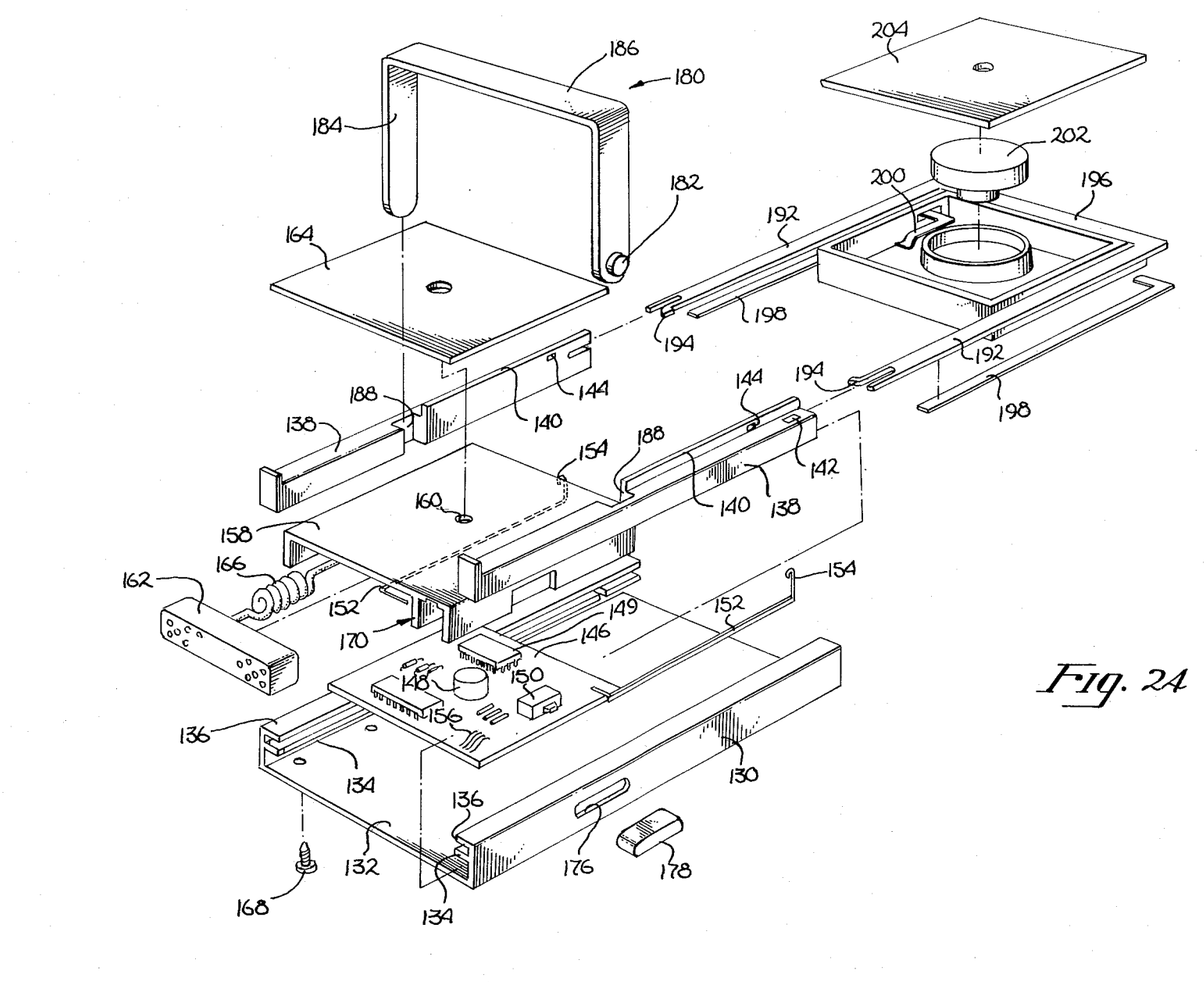
FIG. 24 is an exploded perspective view of the embodiment of FIG. 18.
Figure 25:
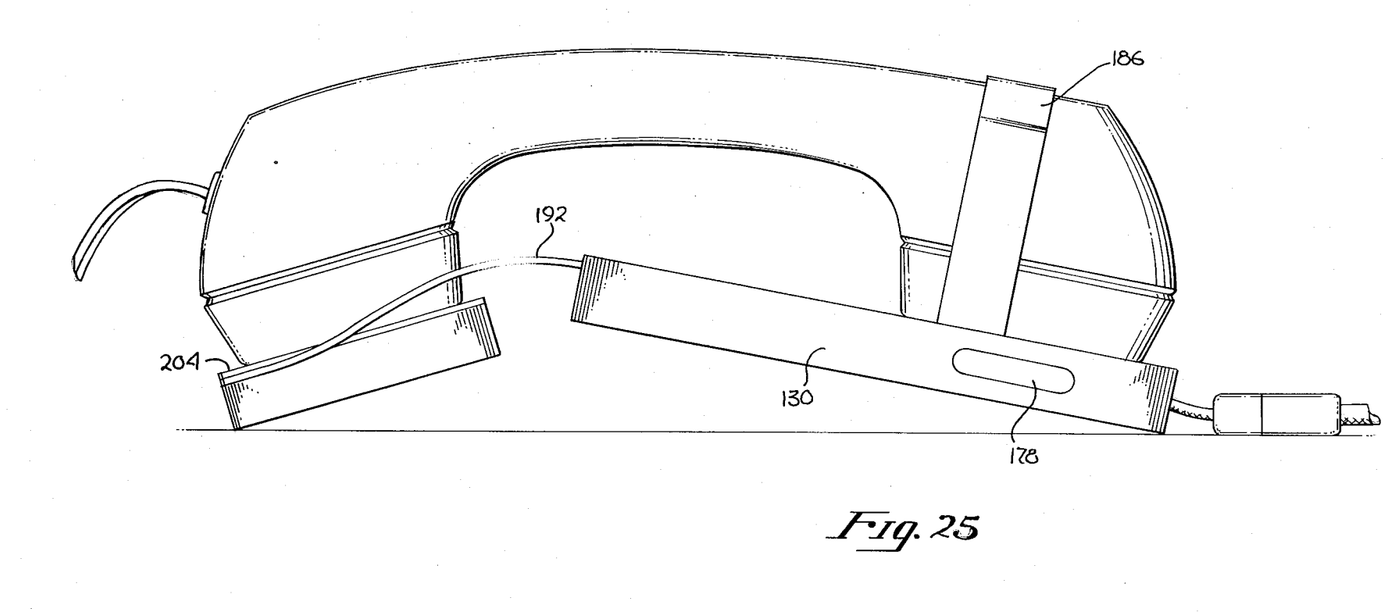
FIG. 25 is a view illustrating the manner of attachment of the modem of FIG. 18 to a conventional telephone handset.

With specific reference to FIG. 24 and to a lesser extent, FIGS. 19 through 23, the cooperation of the various parts, including the parts heretofore undescribed will be illustrated, generally with respect to the manner of assembly thereof. A small printed circuit board 146 is assembled having a large scale (LSI) integrated circuit modem, schematically indicated by the numerals 146, and with a small microphone 148 and a push button control switch 150 thereon for switching between direct connect and acoustic coupled modes. Also connected to the printed circuit board are a pair of beryllium copper members 152, each having an upward extending projection 154 at one end thereof bent in the form of a wiper. There are also four wire loop contacts 156 on the printed circuit board positioned with a form and spacing so as to make contact with a conventional modular telephone jack.

Located above the printed circuit board 146 of FIG. 24 is a cover member 158 having an opening 160 for providing good acoustic coupling to the microphone 148, the cover 158 in turn having a rubber surface piece 164 cemented thereto to provide a soft nonslip surface for engaging the telephone earpiece. Also shown in FIG. 24 is a connector 162 similar to a standard RS-232 connector, which in this embodiment is coupled to the printed circuit board 146 through a coiled line 166 to allow pulling connector 162 away from the body of the unit for greater ease in connecting and disconnecting the connector to a mating connector. These various parts are held in position by screws 168 (only one being shown) which fasten members 138 and cover 158 down against the surface of plate 132, clamping the printed circuit board 146 thereunder. This disposes the wire contacts 156 in the opening at the end of member 158, generally indicated by the numeral 170, which is formed so that, in cooperation with the contacts 156, a modular connector receptacle is effectively created, thereby allowing direct connection to a telephone line. Also, when the parts are assembled in the manner described, the upward extensions 154 of beryllium copper members 152 extend through holes 142 in members 138 in a deflectable manner so as to provide a spring loaded wiper near the end of each of the two slots defined by projections 134 and 136. With the printed circuit board fastened or clamped in the appropriate position, the actuating member of switch 15 is appropriately positioned adjacent slot 176 at the sides 130 at the main body member so as to receive a push button actuation member 178 through the slot.

An elastic tiedown member, generally indicated by the numeral 180, is molded in the U shape shown with circular extensions 182 at the ends of each of the legs thereof. Preferably member 180 is integrally molded, through legs 184 may be formed using a firmer setting elastomer than the base section 186 so that the primary elasticity of member 180 is provided by the base region. During assembly of the parts heretofore described, the protrusions 182 on member 180 are located within opening or slots 188 in member 138 and project under lip 134 on member 130. With member 158 assembled and fastened in position, tiedown 180 is positively retained, though free to pivot about pins 182 from the position shown to a horizontal position whereby the elastic portion 186 overlies the end of member 130 in the face of connector 162 to retain the connector in position and provide a dirt cover thereover.

Also shown in FIG. 24 are the parts of the slide assembly shown further in the various FIGS. 18 through 23. The slide assembly is comprised of a main body 190 having integrally molded legs 192 with specially formed inwardly projecting tabs 194 at the ends thereof. The legs 192 are integral with body 190 along the region 196 thereof, being unconnected at the sides as in the earlier embodiments. Positioned just below the legs 192 are spring metal contact strips 198 having a U shaped end 200 thereon, each for electrical connection to the speaker 202 fitting within body 190. The metal contact members 198 are cemented to the lower surfaces of legs 192, the ends 194 of the legs being deflectable so that each leg may be slid into one of the slots defined by members 134 and 136 of the body until ends 194 snap into openings 144, which together with ends 194 are cooperatively shaped so that ends 194 hook into opening 144 to prevent removing the slide assembly from the rest of the assembly, but to allow the sliding of the slide assembly from the position shown in FIGS. 18, 21 and 22 to the position illustrated in FIGS. 19 and 20. The wipers 154 of course extend through openings 142 and provide a wiping action on the metal contact strips 198 to provide electrical contact between the two leads of the speaker 202 and the printed circuit board.

There has been disclosed and described herein new and unique coupling devices which are very compact and yet provide a capability of providing acoustic coupling to conventional telephones of varying proportions and configurations. While the specific embodiments disclosed are embodiments comprising an acoustic coupler only and a complete acoustic coupled modem and direct connect modem, it is to be understood that other devices sometimes requiring acoustic coupling may be similarly packaged, such by way of example, mini portable terminals, in which case a portion of the top face of the body 74 would comprise a miniature keyboard and another portion thereof would comprise a liquid crystal display. Of course for any such configuration as well as the embodiment specifically disclosed with respect to FIGS. 8 through 17, power may be supplied from the data devices through connector 122, or alternatively a connection 126 (FIG. 8) may be provided for connecting a conventional 115 volt powered AC to DC converter (or battery) to the device. Thus while specific embodiments to the present invention have been disclosed and described in detail, it will be understood by those skilled in the art that various changes in form and detail may be made therein without departing from the spirit and scope of the invention.

We claim:
1. A device for acoustic coupling to a telephone handset having first and second acoustic devices comprising
   a body means having first and second ends and having a first acoustic coupler adjacent said first end thereof, said body means being a means for resting against a part of a handset whereby said first acoustic coupler may acoustically couple with a first acoustic device in a telephone handset
   a slide means having a second acoustic coupler adjacent to an outer end thereof, said slide means being slideable with respect to said second end of said body means between a first retracted position whereby said slide means is substantially circumscribed by said body means and a second extended position whereby said second acoustic coupler is substantially spaced from said body means, whereby said slide means may be retracted when not in use, and the position of said slide means may be adjusted when in use so that said first and second couplers may simultaneously acoustically couple with said first and second acoustic devices in a telephone handset, and means for coupling said device to a telephone handset.

2. The device of claim 1 wherein said slide means is a flexible means, whereby said slide means may elastically deflect to accommodate an angularity between said first and second acoustic devices in a handset.

3. The device of claim 2 wherein said body means and said slide means include contact means for making electrical connection between said body means and said second acoustic coupler, whereby electrical connection may be made to both said first and second acoustic couplers by making electrical connection to said body means.

4. The device of claim 1 wherein said means for coupling said device to a telephone handset is an elastic member coupled to said body means.

5. The device of claim 1 wherein said body means is comprised of a body assembly having said first acoustic coupler therein, and a frame means at least in part circumscribing said body assembly, said frame means being rotatably coupled to said body assembly adjacent said second end of said body means so as to be rotatable between a first position substantially coplanar with said body assembly and a second position substantially angularly displaced therefrom, said means for coupling said device to a telephone handset being coupled to said frame means.

6. The device of claim 5 wherein said means for coupling said device to a telephone handset is an elastic member fastened to said frame means at spaced apart locations so as to substantially overlie said first acoustic coupler when said frame means is in said first position, whereby a portion of a handset may be placed against said first acoustic coupler when said frame means is in second position, and will be retained by said elastic means when said frame means is moved back to said first position.

7. The device of claim 5 wherein said slide means is slideable in said body assembly.

8. The device of claim 5 wherein said slide means is slideable in said frame means.

9. The device of claim 1, wherein said slide means has a coupler region adjacent the outer end thereof containing said second acoustic coupler, and a rail-like adjacent each side thereof for sliding with respect to said body means, said rail-like members being coupled to said coupler region of said slide means substantially closer to said outer end of said slide means than said second coupler is located, whereby deflection of said rail-like members when the device is coupled to various handsets will generally encourage said second coupler to lie flat against said second acoustic device in such handsets, independent of reasonable variations in handset geometries.

10. The device of claim 9 wherein said rail-like members have conductive regions thereon electrically connected to said second coupler, and said body means has cooperatively disposed contacts to make electrical contact to said conductive regions when the device is coupled to a telephone handset, whereby electrical contact may be made to said first and second couplers by a cable coupled to said body means.

11. The device of claim 1 wherein said body means has a modem therein.

12. The device of claim 11 wherein said body means also has a modular connector therein coupled to said modem, whereby said modem may be used as either an acoustic coupled or a direct connect modem.

13. A device for acoustic coupling to a telephone handset having first and second acoustic devices comprising a body assembly having first and second ends and having a first acoustic coupler adjacent said first end thereof, said body assembly being a means for resting against a part of a handset whereby said first acoustic coupler may acoustically couple with a first acoustic device in a telephone handset a frame means at least in part circumscribing said body assembly, said frame means being rotatably coupled to said body assembly adjacent said second end of said body assembly so as to be rotatable between a first position substantially coplanar with said body assembly and a second position substantially angularly displaced therefrom a slide means having a second acoustic coupler adjacent to an outer end thereof, said slide means being slideable with respect to said second end of said body assembly between a first retracted position whereby said slide means is substantially circumscribed by said body assembly and a second extended position whereby said second acoustic coupler is substantially spaced from said body assembly, whereby said slide means may be retracted when not in use, and the position of said slide means may be adjusted when in use so that said first and second couplers may simultaneously acoustically couple with said first and second acoustic devices in a telephone handset and means for coupling said device to a telephone handset, said means for coupling said device to a telephone handset being an elastic member fastened to said frame means at spaced apart locations so as to substantially overlie said first acoustic coupler when said frame means is in said first position, whereby a portion of a handset may be placed against said first coupler when said frame means is in second position, and will be retained by said elastic means when said frame means is moved back to said first position.

14. The device of claim 13 wherein said slide means is a flexible means, whereby said slide means may elastically deflect to accommodate an angularity between said first and second acoustic devices in a handset.

15. The device of claim 14 wherein said body assembly and said slide means include contact means for making electrical connection between said body assembly and said second acoustic coupler, whereby electrical connection may be made to both said first and second acoustic couplers by making electrical connection to said body assembly.

16. The device of claim 15, wherein said slide means has a coupler region adjacent the outer end thereof containing said second acoustic coupler, and a rail-like member adjacent each side thereof for sliding with respect to said body assembly, said rail-like members being coupled to said coupler region of said slide means substantially closer to said outer end of said slide means than said second coupler is located, whereby deflection of said rail-like members when the device is coupled to various handsets will generally encourage said second coupler to lie flat against said second acoustic device in such handsets, independent of reasonable variations in handset geometries.

17. The device of claim 16 wherein said rail-like members have conductive regions thereon electrically connected to said second coupler, and said body assembly has cooperatively disposed contacts to make electrical contact to said conductive regions when the device is coupled to a telephone handset, whereby electrical contact may be made to said first and second couplers by a cable coupled to said body assembly.

18. A device for acoustic coupling to a telephone handset having first and second acoustic devices comprising
   a body assembly having first and second ends and having a first acoustic coupler adjacent said first end thereof, said body assembly being a means for resting against a part of a handset whereby said first acoustic coupler may acoustically couple with a first acoustic device in a telephone handset
   a frame means at least in part circumscribing said body assembly and having first and second ends, said second end of said frame means being rotatably coupled to said body assembly adjacent said second end of said body assembly so as to be rotatable between a first position substantially coplanar with said body assembly and a second position substantially angularly displaced therefrom
   a slide means having a second acoustic coupler adjacent an outer end thereof, said slide means being slideable with respect to said second end of said frame means between a first retracted position whereby said slide means is substantially circumscribed by said frame means and a second extended position whereby said second acoustic coupler is substantially spaced from said frame means, whereby said slide means may be retracted when not in use, and the position of said slide means may be adjusted when in use so that said first and second couplers may simultaneously acoustically couple with said first and second acoustic devices in a telephone handset; and
   means for coupling said device to a telephone handset; said means for coupling said device to a telephone handset being an elastic member fastened to said frame means at spaced apart locations so as to substantially overlie said first acoustic coupler when said frame means is in said first position, whereby a portion of a handset may be placed against said first acoustic coupler when said frame means is in second position, and will be retained by said elastic means when said frame is moved back to said first position.

19. The device of claim: 18 wherein said slide means is a flexible means, whereby said slide means may elastically deflect to accommodate an angularity between said first and second acoustic devices in a handset.

20. The device of claim 19 wherein said body assembly and said slide means include contact means for making electrical connection between said body assembly and said second acoustic coupler, whereby electrical connection may be made to both said first and second acoustic couplers by making electrical connection to said body assembly.

21. The device of claim 18, wherein said slide means has a coupler region adjacent the outer end thereof containing said second acoustic coupler, and a rail-like member adjacent each side thereof for sliding with respect to said frame means, said rail-like members being coupled to said coupler region of said slide means substantially closer to said outer end of said slide means than said second coupler is located, whereby deflection of said rail-like members when the device is coupled to various handsets will generally encourage said second coupler to lie flat against said second acoustic device in such handsets, independent of reasonable variations in handset geometries.

22. The device of claim 21 wherein said rail-like members have conductive regions thereon electrically connected to said second coupler, and said body assembly has cooperatively disposed contacts to make electrical contact to said conductive regions when the device is coupled to a telephone handset, whereby electrical contact may be made to said first and second couplers by a cable coupled to said body assembly.

23. The device of claim 18 wherein said body assembly has a modem therein.

24. The device of claim 23 wherein said body assembly also has a modular connector therein coupled to said modem, whereby said modem may be used as either an acoustic coupled or a direct connect modem.

* * * * *